(12) United States Patent
Huang et al.

(10) Patent No.: US 8,923,820 B2
(45) Date of Patent: Dec. 30, 2014

(54) MODIFIED MESSAGING SERVER CALL FLOW FOR SECURED MOBILE-TO-MOBILE MESSAGING

(71) Applicant: Cellco Partnership, Basking Ridge, NJ (US)

(72) Inventors: Ye Huang, San Ramon, CA (US); Jerry M. Kupsh, Concord, CA (US)

(73) Assignee: Cellco Partnership, Basking Ridge, NJ (US)

( * ) Notice: Subject to any disclaimer, the term of this patent is extended or adjusted under 35 U.S.C. 154(b) by 77 days.

(21) Appl. No.: 13/715,822

(22) Filed: Dec. 14, 2012

(65) Prior Publication Data

US 2014/0171024 A1 Jun. 19, 2014

(51) Int. Cl.
*H04M 3/16* (2006.01)
*H04W 12/06* (2009.01)
*H04W 4/12* (2009.01)

(52) U.S. Cl.
CPC ............... *H04W 4/12* (2013.01); *H04W 12/06* (2013.01)
USPC ...... 455/411; 455/410; 455/412.1; 455/412.2; 455/418

(58) Field of Classification Search
CPC ..... H04W 12/12; H04W 12/10; H04W 12/06; H04W 12/02; H04W 12/08
USPC .................... 455/410, 411, 412.1, 412.2, 418
See application file for complete search history.

(56) References Cited

U.S. PATENT DOCUMENTS

2010/0058064 A1* 3/2010 Kirovski et al. .............. 713/176
2011/0179473 A1* 7/2011 Lee et al. ........................ 726/6

OTHER PUBLICATIONS

S/MIME Support Package for Blackberry smartphones, Version 6.0, Security Technical Overview; Published Mar. 2, 2011; 39 pages.
"New Version of iOS Includes Notification Center, iMessage, Newsstand, Twitter Integration Among 200 New Features," Apple Press Release, Jun. 6, 2011; 2 pages <http://www.apple.com/pr/library/2011/06/06New-Version-of-iOS-Includes-Notification-Center-iMessage-Newsstand-Twitter-Integration-Among-200-New-Features.html>.

* cited by examiner

*Primary Examiner* — Khalid Shaheed

(57) ABSTRACT

Systems and techniques are provided for transmitting a secured message from an originating device to a recipient mobile device through a mobile communication network. A secure communication channel to the recipient mobile device is established via the mobile communication network based on a request for transmission of a secured message from the originating device. A notification of the secured message including instructions for retrieving the secured message is sent to the recipient mobile device through the established secured communication channel. The recipient mobile device is authenticated based on authentication credentials associated with the recipient mobile device. The recipient mobile device is allowed to retrieve the secured message via the secure data channel of the mobile communication network using the instructions included in the notification.

22 Claims, 6 Drawing Sheets

MODIFIED MESSAGING SERVER CALL FLOW FOR SECURED MOBILE-TO-MOBILE MESSAGING

BACKGROUND

In recent years, use of mobile communications devices for voice telephone services, email or text messaging services and even multi-media services has become commonplace, among mobile professionals and throughout the more general consumer population. Mobile communication services provided through public cellular or PCS (personal communication service) type networks, particularly for voice telephone service, have become virtually ubiquitous across much of the world. The mobile communication services offered by a wireless carrier or operator of a mobile communication network may include different messaging services that enable different mobile subscribers to exchange various types of messages with one another via an application or interface executable at their respective mobile devices. Some of these subscribers may need to exchange messages including sensitive or confidential information and thus, may require a secure way to exchange such messages over a mobile communication network. For example, enterprise subscribers (e.g., commercial entities, government agencies, healthcare organizations, financial institutions, etc.) or other individual subscribers (e.g., doctors or stock traders) may need a secure way to send and receive such messages between different mobile devices of users (e.g., messages between different enterprise personnel or messages to and from clients). However, conventional mobile-to-mobile messaging solutions relating to the transmission of messages over a radio link or through a wireless communication network generally require a compromise between security, ease-of-use and limitations with respect to the type of device or service that may be used.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF PREFERRED EMBODIMENTS

Figure 1:
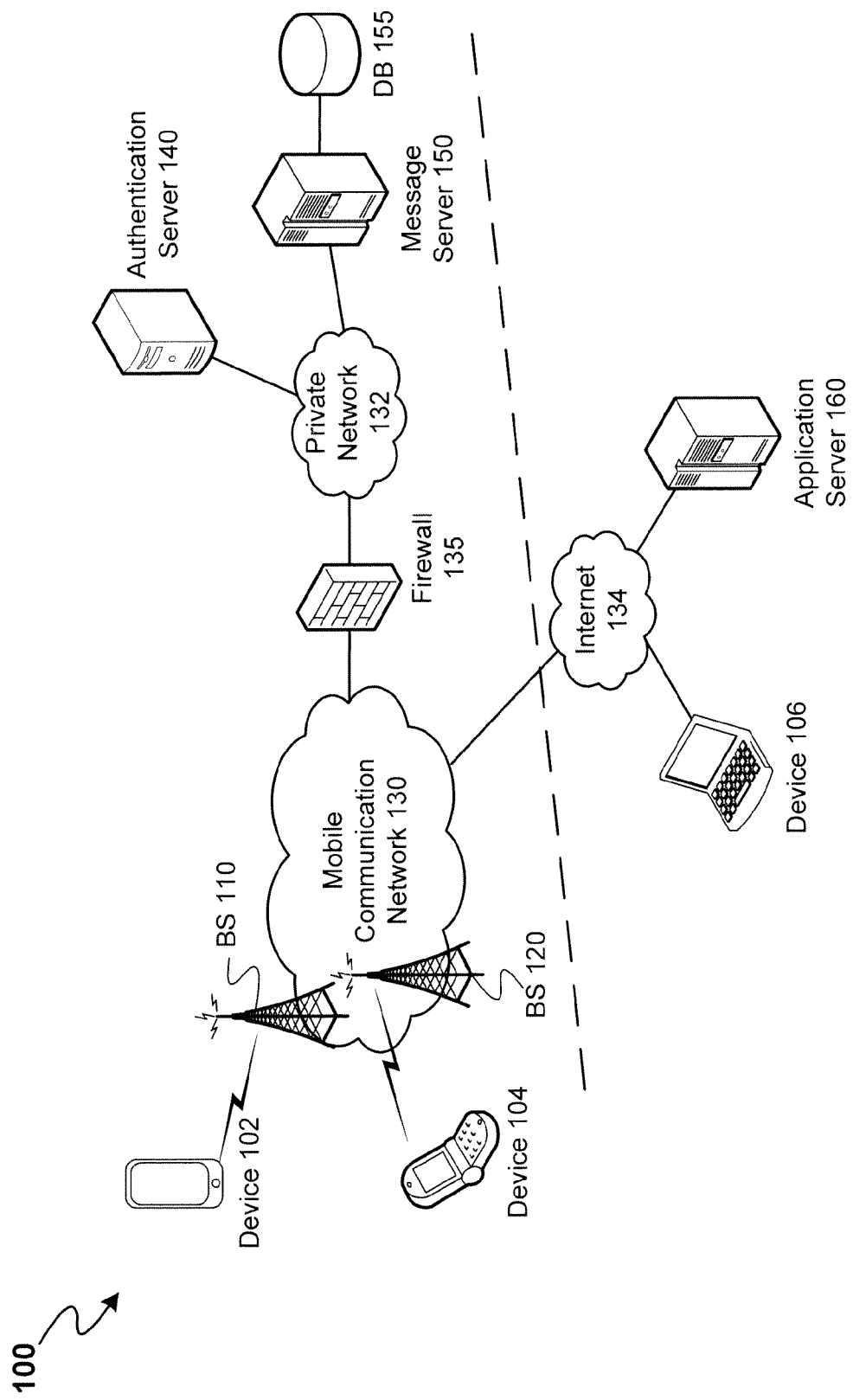
FIG. 1 illustrates an exemplary network environment for providing various mobile communication services, including secure messaging services for different users through a mobile communication network.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The systems and techniques disclosed herein enable a wireless carrier or operator of a mobile communication network to provide secure messaging services to users or subscribers through the mobile communication network. In some implementations, the secure messages may be provided to the respective mobile devices of such users through a Multimedia Messaging Service (MMS) subsystem of the mobile communication network using Hypertext Transfer Protocol (HTTP). The examples illustrated in FIGS. 1-4 will be described below in various contexts involving secured communications between different types of secured messaging applications. Examples of such secured messaging applications include, but are not limited to, mobile-to-mobile messaging applications for exchanging secured messages between different mobile devices that are each in the same or a different wireless carrier's mobile communication network. Other examples of such secured messaging applications include applications for secured message exchange between a third-party application server (or third-party application or service hosted by the server) and a mobile device. Similar to the mobile-to-mobile messaging example above, the application server and mobile device may be in the same mobile communication network or in different mobile communication networks operated by different wireless carriers.

In an example, a secure message delivery option is provided to a user via an interface of a messaging client application executable at the user's mobile device. In some implementations, the messaging client application is a modified version of an existing messaging client that includes an option for secure message delivery to a message recipient (e.g., another mobile device user) through the mobile communication network. Further, the messaging client application executable at the user's mobile device also allows the mobile device to receive secure messages from other computing devices (e.g., other mobile devices or desktop/workstation devices) or third-party applications or services. Such third-party applications or services may be hosted at application servers located in either the same mobile communication network or a different network, e.g., associated with another wireless carrier.

In some implementations, the user composes a message using the interface of the messaging client at the mobile device and enables the above-described secure message delivery option for the message. The content of the message may include, for example and without limitation, text or multimedia content (e.g., image or graphics content), as desired by the user. Before sending the message, the client application generates a secured or encrypted version of the message, which can be sent to a similar client application executable at a recipient mobile device. In contrast with conventional messaging applications that generally transmit messages using Hypertext Transfer Protocol (HTTP), the client application described herein transmits the secured/encrypted message through a secured MMS communication channel of the mobile communication network using, for example, Hypertext Transfer Protocol Secure (HTTPS). A benefit of using HTTPS is that enables the Secure Sockets Layer (SSL) cryptographic protocol for communicating encrypted data through the mobile communication network, e.g., using an encrypted or secured communication channel between the mobile device and the MMS subsystem (referred to herein as the "MMSC") of the mobile communication network. In some implementations, the secured communication channel may be a dedicated data channel or pathway established between the MMSC and mobile device for secured message communications.

Additional benefits of the techniques described herein relative to conventional solutions include, but are not limited to, allowing mobile device users to subscribe to secure message delivery services offered by a wireless carrier through an existing interface for sending and receiving messages at the user's mobile device, without making any significant changes to the mobile device itself. In contrast with conventional solutions, the techniques described herein may be implemented across different types of computing devices supported by the carrier's communication network. Supported devices may include, but are not limited to, cellular handset devices (e.g., smart phones) as well as tablet, notebook or netbook computers having similar messaging capabilities via an interface provided at the respective device. Further, these techniques may be implemented in a carrier's mobile communication network without requiring the carrier to make any substantial modification to the existing infrastructure or systems of the mobile communication network.

The detailed description below uses a number of terms with respect to various system components and operations. Although generally known, use of several of these terms may not be strictly standardized in the art. For the convenience of the reader, the following definitions for some of the relevant terms are presented, as used by way of example in the detailed description below.

The terms "operator" and "carrier" are used herein interchangeably to refer broadly and inclusively to any provider or supplier of mobile network communication services, including services for the transmission of real-time voice and data communications for mobile device users/subscribers through a wireless or mobile communication network. An operator or carrier can be, for example and without limitation, a wireless service provider that provides various communication services to mobile phone subscribers. The services provided by the carrier may include, for example and without limitation, messaging services for sending messages with text and/or multimedia content over Internet Protocol (IP) networks including the Internet or similar networks. As will be described in further detail below, messaging services involving the communication of secured or encrypted data may be provided by the wireless carrier/operator using a secure communication channel via a radio access network (e.g., 3G or 4G data network) of the overall mobile communication network. In some implementations, this radio access network may be of a different type than the radio access network (e.g., based on One (1) times (x) Radio Transmission Technology or "1xRTT") used for voice calls routed through the overall mobile communication network.

The term "client" is used herein to refer broadly to any process configured to consume a functionality of a service hosted by an application server. Such a client can be any type of remote or local process with respect to the computing device executing or hosting the service. Also, a client can be another application or service. Further, such a client may be executed at any type of computing device including, for example and without limitation, a desktop computer or workstation, a mobile device, or a host or network device that may operate at other times as a server to other clients. For example, an application client executable at a computing device (e.g., a mobile device or desktop computer) generally communicates with the application server over a communication network in order to utilize one or more functions provided by the service. Such a server may be any type of computing device capable of communicating data to one or more clients over a communication network.

Reference now is made in detail to the examples illustrated in the accompanying drawings and discussed below. FIG. 1 illustrates a functional block diagram of an exemplary network environment 100 for providing mobile voice and data services across different communication networks. Such data services may include, but are not limited to, secure messaging services for exchanging secured messages between different entities, as will be described in further detail below. In the example illustrated in FIG. 1, network environment 100 includes a mobile communication network 130 to facilitate communications between various computing devices 102, 104 and 106 and at least one server via different types of networks including, but not limited to, a private network 132 and the Internet 134, as will be described in further detail below. As shown in FIG. 1, each of devices 102 and 104 are mobile devices, which may be any type of mobile telecommunication device with at least one processor, a network communication interface (e.g., wireless transceiver), a memory, a display and one or more user input devices (e.g., a touch-screen display, microphone, QWERTY keyboard or T9 keypad). Examples of such mobile telecommunication devices include, but are not limited to, portable handsets, smart-phones, tablet computers and personal digital assistants. Also, as shown in FIG. 1, techniques described herein allow secured communications to and from other types of devices including, for example, a device 106. Device 106 may be, for example and without limitation, any type of laptop, desktop or other personal computing device with at least one processor, a memory, a display, one or more user input devices and at least one network communication device for communications through one or more different types of networks including mobile communication network 130 (e.g., via a wireless network card integrated with or coupled to device 106). While only devices 102, 104 and 106 are shown in FIG. 1, network environment 100 can be used to facilitate data communications for additional devices (not shown). Also, while not shown in FIG. 1, each network in network environment 100 may include intermediate network routers, gateways or servers between network components/devices.

For purposes of discussion, mobile communication network 130 will be described in the context of a network supporting both CDMA and 3rd Generation Partnership Project (3GPP) network technologies including, for example and without limitation, 3GPP type 2 (or 3GPP2) and 3GPP Long Term Evolution (LTE, at times also referred to as 4G). As described above, mobile communication network 130 may use separate communication channels and radio access networks for communicating voice and data, respectively, to mobile devices 102 and 104. In an example, the radio access network for data communications is a 3G or 4G data network using 3GPP or 4G LTE technology and the radio access network for voice calls is a CDMA network using 1xRTT. However, it should be noted that the techniques described herein are not intended to be limited thereto and may be implemented using other types of mobile communication network technologies as desired for a particular implementation.

In an example, mobile communication network 130 enables secured communications between mobile devices 102 and 104. As described above, mobile communication network 130 also enables secured between each of mobile devices 102 and 104 and other mobile devices on a different mobile communication network (not shown), e.g., operated by a different wireless carrier or operator. In some implementations, an inter-carrier or other intermediate network gateway of mobile communication network 130 enables communications between mobile communication network 130 and the mobile communication networks of different third-party wireless carriers. Mobile communication network 130 also allows respective users of mobile devices 102 and 104 to initiate and receive telephone calls to each other as well as other devices within the same or different mobile communication networks. In an example, mobile communication network 130 offers a variety of text and other data services, including services via the Internet 134. Such services may include, for example and without limitation, services for downloading applications and other types of content, web browsing, and various messaging services, including exchange services for electronic mail ("email") as well as Short Messaging Service (SMS) and Multimedia Messaging Service (MMS) for sending and receiving text and multimedia messages, respectively. As will be described in further detail below, such messaging services may also provide support for secured message communications (e.g., secured text and/or multimedia messages) between a user of, for example, mobile device 102 and other mobile device users (e.g., user of mobile device 104) or users of terminal personal computing devices (e.g., device 106) through mobile communication network 130 and/or other communication networks (e.g., Internet 134).

In some implementations, mobile communication network 130 includes a number of interconnected access networks for providing voice and data communication services to mobile device subscribers/users. Hence, the overall mobile communication network 130 may include a number of radio access networks (RANs), as well as regional ground networks interconnecting a number of RANs and a wide area network (WAN) interconnecting the regional ground networks to core network elements. A regional portion of network 130, such as that serving mobile devices 102 and 104 will typically include one or more RANs and a regional circuit and/or packet switched network and associated signaling network facilities. Physical elements of a RAN are generally operated by a mobile network operator or wireless carrier of mobile communication network 130. Such physical elements include a number of base stations, as represented in the example shown in FIG. 1 by a base station (BS) 110 and a base station 120.

Although not separately shown, each of base stations 110 and 120 may include a base transceiver system (BTS). A BTS communicates via an antennae system at the site of the respective base stations 110 and 120 via an over-the-air communication link with one or more mobile devices that are within a particular signal coverage range of the BTS. The BTS is the part of the radio network that sends and receives RF signals to/from mobile devices 102 and 104, as served by base stations 110 and 120, respectively. In this example, the BTS utilizes CDMA type transceiver equipment and implement communications in accord with the protocols of the applicable 3GPP2 standard, for signaling, registration, voice communication, data communication, etc. Thus, each of base stations 110 and 120 is configured to broadcast certain standardized information (e.g., in accordance with, CDMA or LTE communication protocols) to mobile devices 102 and 104 in addition to other mobile devices (not shown) within range of the particular base station so as to enable each device to find and establish a communication link with the base station via mobile communication network 130.

The radio access networks of mobile communication network 130 also include a mobile traffic network for voice communications between each mobile device, base stations 110 and 120 and other network elements. Individual elements (e.g., switches, gateways and/or routers) forming the traffic network are omitted from FIG. 1 for ease of discussion. Although not separately shown, the mobile communication network 130 will include or communicate with a number of service control elements. Such service control elements may include, for example, elements for authenticating mobile devices 102 and 104 to access mobile communication network 130. Additionally, such elements may include authorization control elements for authorizing users or devices for accessing various communication services and features offered by network 130. Further, such elements may include a billing system for purposes of usage accounting and billing functions of network 130. Some of these authentication or authorization functions may require credentials information from the mobile devices or their respective users (e.g., on a periodic basis for security reasons).

In some implementations, the above-described traffic network portion of mobile communication network 130 connects to other public packet switched data communication networks (not shown) in addition to the Internet 134, as shown in FIG. 1. Packet switched communications via the traffic network of mobile communication network 130 and the Internet 134 may support a variety of messaging and other types of communications services for mobile device users. As such, the wireless carrier or service provider that operates mobile communication network 130 generally also operates a number of systems that provide ancillary functions in support of the communications services provided through mobile communication network 130.

In the example shown in FIG. 1, a messaging system of mobile communication network 130 includes a message server 150 and a database 155. Message server 150 provides messaging services for subscribers (e.g., users of mobile devices 102 and 104) of communication services provided by the wireless carrier operating mobile communication network 130. Message server 150 may be used to provide different types of messaging services to users of mobile devices 102 and 104 through mobile communication network 130. In an example, such messaging services are implemented within message server 150 as, for example, different functional components of message server 150 corresponding to the different messaging services. While only message server 150 is shown in FIG. 1, it should be noted that the present disclosure is not limited to a single message server and that the different messaging services may be implemented using separate and individual message servers. Examples of such message servers include, but are not limited to, a short message service center (SMSC) server, a multimedia message service center (MMSC) server, an enhanced message service center (EMSC) server, or the like. Accordingly, message server 150 may transfer messaging service messages (e.g., short messaging service (SMS) messages, multimedia messaging service (MMS) messages, enhanced messaging service (EMS) messages, or the like) between mobile devices 102 or 104 and other types of computing devices (e.g., device 106) through mobile communication network 100.

As shown in FIG. 1, mobile communication network 130 also includes an authentication server 140 for authenticating mobile devices 102 and 104 for access to the functionality of communication services provided through mobile communication network 130, and for which the users of the respective mobile devices 102 and 104 have subscribed. In some implementations, an account authentication and authorization system for authenticating and authorizing subscribers, including users of mobile devices 102 and 104, for access to the communication services provided by mobile communication network 130. In an example, authentication server 140 may be implemented as a single sign-on (SSO) authentication server that uses SSO authentication for controlling access to secured communications exchanged between different subscriber devices (e.g., mobile devices 102 and 104).

Authentication server 140 and message server 150 as well as other network elements, as described above, may be configured to communicate with each other via a private network 132. In some implementations, private network 132 is an Internet Protocol (IP) based packet data network behind a firewall 135 or security layer that functions to maintain secure communications between the system components of the private network 132 by preventing unauthorized access by devices via other networks. In the example of FIG. 1, such system components include a database 155 communicatively coupled to message server 150 and other network devices via private network 132. Database 155 may be used to store various types of data used by message server 150 for processing requests for secured message communications for mobile devices 102 and 104.

In some implementations, database 155 is used to store device-specific information related to mobile devices 102 and 104 as well as other mobile devices on mobile communication network 130. The device-specific information for each mobile device may be stored within database 155 in association with a unique mobile device identifier associated with the device. Examples of such a unique mobile device identifier may include, but are not limited to, a mobile device identifier is a Mobile Directory Number ("MDN"), a Mobile Equipment Identifier ("MEID") or a Mobile Identifier Number ("MIN"). In an example, the mobile device identifier associated with a mobile device is used by the wireless carrier to identify the particular device for determining whether or not the device is on the same or a different wireless carrier's mobile communication network, as will be described in further detail below.

In an example, the device-specific information includes subscriber data related to different subscribers or users of mobile devices (e.g., including mobile devices 102 and 104) for purposes of accessing secured messaging services provided through mobile communication network 130. The subscriber data stored at database 155 may include, for example, security credentials associated with each subscriber/user of a mobile device for authenticating the particular user in response to a request for sending secured messages from the mobile device through mobile communication network 130. Further, a client application executable at each of mobile devices 102 and 104 configures the respective device to communicate with message server 150 in order to register security credentials associated with the mobile device (or user thereof). The registered information may further include a network, e.g., Internet Protocol (IP), address assigned to the mobile device by, for example, a gateway or router device of mobile communication network 130. For example, in response to receiving a secured communication request from mobile device 102 or 104 (or a client application executable at each device) via the mobile communication network 130, message server 150 or a provisioning server of the network stores the registered network address of mobile device 102 or 104 in association with subscriber account information previously stored for the particular mobile device within database 155.

In an example, the aforementioned client application executable at each of mobile devices 102 and 104 is a message client application configured to communicate with message server 150 to retrieve secured messages through mobile communication network 130, as will be described in further detail below. In a different example, the client application may also be configured to communicate with a third-party application server 160 through mobile communication network 130 and one or more other networks such as the Internet 134, as shown in the example of FIG. 1. In this example, application server 160 may be associated with a third-party application or service, and the wireless carrier's mobile communication network 130 may be used to facilitate secure messaging transmission between application server 160 and mobile device 102 or 104 (or the associated client application executable at mobile device 102 or 104).

Figure 2:
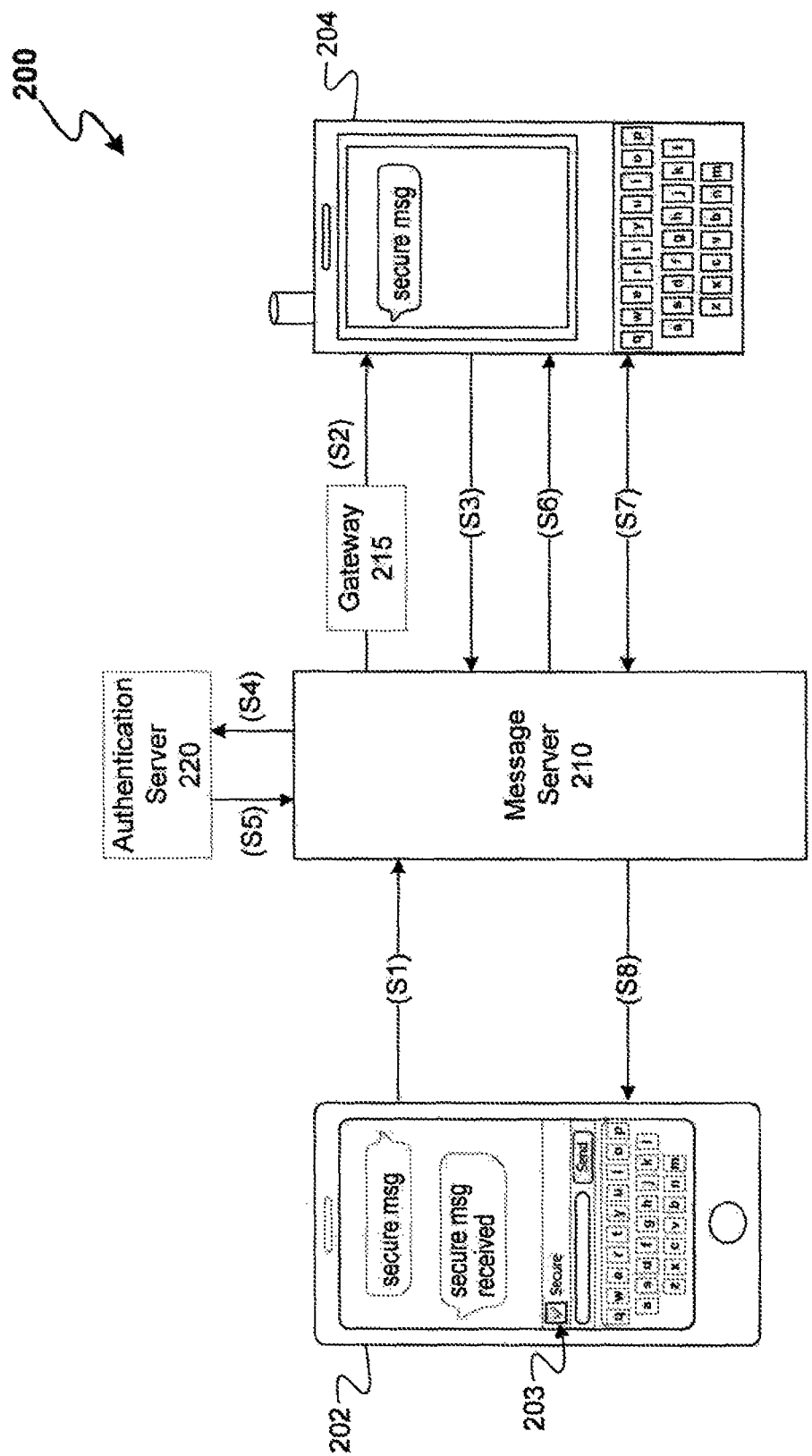
FIG. 2 is an exemplary process flow for enabling secure mobile-to-mobile message transmission between different mobile devices in a mobile communication network.

FIG. 2 is an exemplary process 200 for secure mobile-to-mobile message transmission between different mobile devices in a mobile communication network. For purposes of discussion, process 200 will be described using network environment 100 of FIG. 1, as described above, but process 200 is not intended to be limited thereto. Thus, mobile devices 202 and 204 may be implemented using, for example, mobile devices 102 and 104 of FIG. 1, respectively, as described above. As shown in FIG. 2, a message server 210 (e.g., message server 150 of FIG. 1, as described above) is configured to receive the secured message from mobile device 202 and deliver the secured message to the intended recipient user's mobile device 204. Message server 210 may be implemented using, for example, an MMSC of the wireless carrier's mobile communication network (e.g., mobile communication network 130 of FIG. 1, as described above).

In some implementations, message server 210 communicates with a client application executable at each of mobile devices 202 and 204, as described above with respect to mobile devices 102 and 104 of FIG. 1. The client application executable at each of mobile devices 202 and 204 may be, for example, an enhanced or modified version of a standard messaging client application that provides users with a capability to send and receive secured messages to and from the devices of other users or third-party applications in the same or different mobile communication network, as described above. However, it should be noted that the techniques for secured message delivery as described herein are not limited to standalone messaging client applications and that these techniques may be used in messaging applications integrated within other types of client applications (e.g., a chat application or mobile web browser) executable at mobile devices 202 and 204.

In the example shown in FIG. 2, process 200 begins with the user of mobile device 202 initiating a request (S1) for message server 210 to send a message from mobile device 202 to the user and intended recipient of the message at mobile device 204. The request originating from mobile device 202 may be sent to message server 210 via, for example, a secured HTTP (or HTTPS) communication channel of the mobile communication network. The request sent to message server 210 may include, for example and without limitation, the secured message and the mobile device identifier (e.g., MDN) associated with mobile device 204 or the intended recipient of the secured message. In an example, the user at mobile device 202 may use the interface of an enhanced messaging client application executable at mobile device 202 to compose a new message with the above-described secure message delivery option selected so as to send the message over a secured communication channel to a similar client application executable at the message recipient's mobile device 204. As shown in FIG. 2, the secured message delivery option may be provided to the user via the interface of the messaging client application as a checkbox control element 203 that the user can enable or disable as desired for each new message that the user composes in the application. However, it should be noted that the techniques described herein are not limited thereto and that the secured message delivery option may be implemented using any of various user control elements as desired for a particular implementation. The content of the message may include, for example and without limitation, text or media content (e.g., image or graphics content).

In some implementations, for additional security, the client application executable at mobile device 202 may be configured to generate a secured or encrypted version of the message before it is sent to message server 210. In an example, an encryption key may be included with the encrypted message sent from mobile device 202 to message server 210. The encryption key may be retrieved by mobile device 204 along with the encrypted message from message server 210, and then used by mobile device 204 (or client application executable at mobile device 204) to convert the encrypted message back into its original unencrypted form for the user/recipient of the message.

Upon receiving the request from mobile device 202 via the mobile communication network, message server 210 sends a notification message (S2), e.g., in the form of an SMS message with instructions for mobile device 204 to retrieve the secured message. As shown in FIG. 2, the notification message from message server 210 may be sent to mobile device 204 using a message gateway device 215 coupled to message server 210 through the mobile communication network. The instructions sent to mobile device 204 may include, for example, a network location address (e.g., a uniform resource locator or "URL") and a message identifier associated with the secured message, which may be stored at a local data store or database (e.g., database 155 of FIG. 1, described above) coupled to message server 210.

In an example, message server 210 temporarily stores the secured message and performs an initial determination of whether or not mobile device 204 is available on the mobile communication network prior to sending the notification message before sending the notification message to mobile device 204. Mobile device 204 may be unavailable to receive the secured message or notification message if, for example, it is powered off or out of network signaling range or located outside a wireless service coverage area of the mobile communication network. In cases where mobile device 204 is determined to be unavailable, message server 210 may store the secured message for a predetermined period of time, at least until message server 210 receives an indication that mobile device 204 is available on the mobile communication network. In a further example, message server 210 may also be configured to determine whether or not the recipient mobile device 204 is capable of receiving the type of content included within the secured message being sent from the originating mobile device 202. For example, if message server 210 determines that mobile device 204 does not support at least the type of media content sent from the originating mobile device 202, e.g., video content, the stored secured message may be deleted and message server 210 may send to the originating mobile device 202 an error message indicating that the message content cannot be sent to the intended recipient. The error message may instead, or in addition, specify that the reason that the message content cannot be sent to the intended recipient is that mobile device 204 does not support the type of media content sent from the originating mobile device 202. The error message may, in addition to the reason, specify the type of media content sent from the originating mobile device 202 and identification of the recipient mobile device 204 (e.g., phone number and/or subscriber name). An error notification message may also be sent to originating mobile device 202 if the recipient mobile device 204 is determined to be unavailable for a predetermined period of time.

In some implementations, the client application executable at mobile device 204 may be preconfigured to receive messages from message server 210 at a selected data port. The selected data port may be, for example, a dedicated communication port at mobile device 204 that is reserved specifically for exchanging secured communications with message server 210 over the mobile communication network (e.g., mobile communication network 130 of FIG. 1, as described above). Alternatively, the selected data port may be any available communication port used by mobile device 204 for standard communications with message server 210 or other devices and systems through the mobile communication network. Accordingly, message server 210 may send the notification message (e.g., as an SMS message) directed to the preconfigured port associated with the client application executable at mobile device 204. In an example, the preconfigured data port may be included with other subscriber information stored for the mobile device 204 (or user thereof) within, for example, a database (e.g., database 155 of FIG. 1, as described above) of the mobile communication network. The data port information for mobile device 204 may be preconfigured and stored for later access by message server 210 during a registration process of the client application at mobile device 204. The registration process may be initiated automatically by the client application upon being installed or when first activated by the user at mobile device 204. The registration process may be used to, for example, configure mobile device 204 (or client application executable at mobile device 204) for the secured message transmission service through the mobile communication network as described herein. Further, the preconfigured data port and other subscriber information stored for mobile device 204 may be associated with a unique device identifier (e.g., MDN). Hence, message server 210 may use the unique device identifier included within the request from mobile device 202 (S1) to identify mobile device 204 and retrieve the appropriate data port for directing messages to mobile device 204. In an example, the preconfigured data port is reserved exclusively for communications with mobile device 204. The data port in this example may be assigned only to the MDN associated with mobile device 204, thereby preventing other devices associated with different MDNs from using the data port to direct communications to message server 210. In a different example, the data port may be assigned to a selected group of MDNs or may be unrestricted to any particular MDN and therefore may permit any number of mobile devices to use the data port for purposes of sending and receiving secured communications.

Upon receiving the notification message from message server 210 at the preconfigured data port, the client application at mobile device 204 sends a request (S3) to establish a secured communication channel (e.g., using HTTPS) with message server 210. The request from mobile device 204 may be directed to, for example, a preconfigured data pan that is reserved exclusively for communications with mobile device 204, as described above. Alternatively, mobile device 204 may direct the request (at S3) to a data port specified by message server 210 in the received notification message (at S2). The request from mobile device 204 may include, for example, authentication credentials (e.g., MDN and password) associated with mobile device 204 for accessing the secured message delivery service as described herein. The authentication information from mobile device 204 is sent (S4) from message server 210 to an authentication server 220 (e.g., authentication server 140 of FIG. 1, as described above). Authentication, server 220 may be, for example, an SSO server in the mobile communication network, as described above. Authentication server 220 attempts to authenticate mobile device 204 based on the received authentication credentials and sends to message server 210 a response (S5) indicating whether or not mobile device 204 has been successfully authenticated. If the response from authentication server 220 indicates that mobile device 204 has been authenticated successfully message server 210 sends (S6) an acknowledgement indicating to mobile device 204 (or the client application thereof) that it has been successfully authenticated for accessing the secured message from mobile device 202. The acknowledgment from authentication server 220 may be, for example, a standard "ACK" signal by itself or may include subscriber-specific information that, for example, may be used by the client application executable at mobile device 204 to active activate particular messaging features or services subscribed to by the particular user/subscriber of mobile device 204.

In some implementations, subsequent authentication of mobile device 204 based on authentication credentials in the form of a user name (e.g., MDN) and password combination can be made optional. For example, once authentication (or SSO) server 220 has authenticated mobile device 204 (or its messaging application client) at least once for secured access to the message from mobile device 202, subsequent access to additional secured messages may be based on device credentials such as MDN, MEID, SIM security credentials. In some implementations, mobile device 204 may send a refresh signal to, for example, message server 210 on a periodic basis (e.g., at predetermined time intervals) to maintain the authentication status of mobile device 204. The predetermined time interval for sending the refresh signal may be adjusted based on, for example, the individual user/subscriber associated with mobile device 204 or the amount of time that has elapsed for a particular session of use. Alternatively, mobile device 204 may send the authentication refresh signal to message server 210 only when mobile device 204 (or client application executable at mobile device 204) receives input from the user. In general, the use of such an authentication refresh signal to maintain the status of mobile device 204 as authenticated without having to perform subsequent authentication of the device helps to improve system performance, for example, by reducing the latency associated with further authentication and without allocating additional system resources for this purpose.

In an example, the wireless carrier also provides the user or intended recipient of the secured message with access to the secured message via, for example, a web interface provided in, for example, a web page associated with a subscriber account of the user, which has been registered by the user for accessing the secured message delivery services provided by the wireless carrier through the mobile communication network to mobile device 204. The web interface in this example may require the user to supply the traditional authentication credentials, including the user name and password registered with the subscriber account for accessing secured message delivery services provided by the wireless carrier.

In some implementations, an authentication token may be generated specifically for mobile device 204 to access the functionality of the secured message delivery services. The authentication token may be generated for mobile device 204 during the aforementioned registration or client activation process initiated by the user via, for example, an interface of the client application upon installation of the application at mobile device 204, as described above. Accordingly, the authentication token may be included within the authentication request sent from mobile device 204 to message server 210 (at S3). The authentication token may then be used for authenticating mobile device 204 by message server 210 via authentication server 220 in order to verify that the user of mobile device 204 is actual recipient of the message as intended by the user of mobile device 202. In an example, the authentication token is generated for the specific user or mobile device 204 when the user registers an account or subscribes to the secured messaging service described herein. Upon account activation, copies of the authentication token may be stored, for example, at mobile device 204 and message server 210 or a data store (e.g., database 155 of FIG. 1, described above) coupled to message server 210. The authentication token may be stored, for example, in association with other subscriber information associated with the user (or user's service account), including the unique mobile device identifier (e.g., MDN) associated with the user's mobile device 204. Thus, upon receiving the authentication token from mobile device 204 (at S3), message server 210 in this example is configured to use the received authentication token to retrieve the stored MDN associated with the token. Message server 210 may then verify the identify of the user associated with mobile device 204 is the intended recipient of the secured message by comparing the retrieved MDN with the MDN associated with the intended recipient of the secured message, as specified in the secured message request received from mobile device 202 (at S1).

Once message server 210 provides an indication of successful authentication (S6), mobile device 204 or the client application executable at the device retrieves the secured message (S7) via, for example, a secured HTTPS communication channel. The secured message may be sent as, for example, an MMS message overt HTTPS instead of HTTP, the communication protocol generally used by conventional techniques for sending MMS messages. Upon successful retrieval of the message by the mobile device of the client application, the met server 210 may send (S8) an indication of the retrieval to the mobile device 202 (as shown by the "secure msg received" message presented on the display of the mobile device 202). As described previously, an advantage of the techniques described herein for sending secured message transmission with MMS over HTTPS is the ability to provide a SSL encrypted communication channel between clients and network MMSC.

Figure 3:
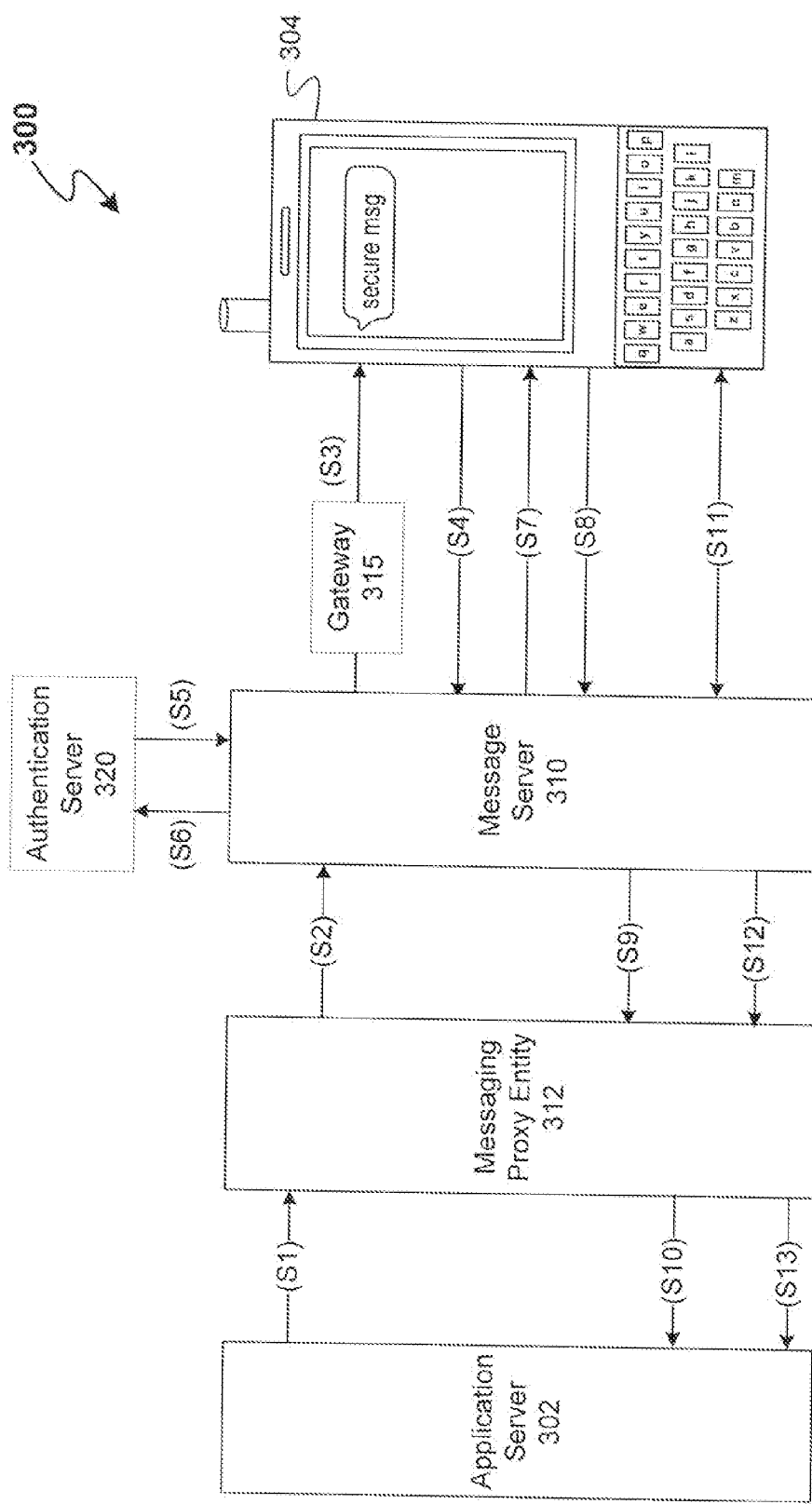
FIG. 3 is an exemplary process flow for enabling secure message transmission between a third-party application or service and a mobile device in a mobile communication network.

FIG. 3 is an exemplary process 300 for enabling secure message transmission between a third-party application or service and a mobile device in a mobile communication network. Like process 200 of FIG. 2, process 300 will be described using network environment 100 of FIG. 1, as described above, but process 300 is not intended to be limited thereto. However, in contrast with process 200 of FIG. 2, the sender of the message in the example shown in FIG. 3 is a third-party application 302, which may be hosted at an application server of a third-party service provider that is located externally to the wireless carrier's mobile communication network. Accordingly, a client application may be installed by the user at mobile device 304 in order to access the functionality of the service provided by third-party application 302. The services provided by third-party application 302 to the user of mobile device 304 via the installed client application may involve, for example, sending secured messages to the user via an interface of the client application as it executes at mobile device 304. For example, third-party application 302 may be a personal banking application and the third-party service provider may be a bank at which the user of mobile device 304 has an account. Also, the client application executable at mobile device 304 may be a mobile banking client application providing the user with an interface for accessing bank account information at mobile device 304. Further, the user in this example may receive personal banking information (e.g., bank account statements) in the form of secured messages from third-party application 302 directed to the banking client application via a secured communication channel (e.g., over HTTPS) of the mobile communication network.

As shown in FIG. 3, process 300 begins with third-party application 302 initiating a request (S1) to send a message (e.g., using MMS) over a secured HTTP (or HTTPS) communication channel of the mobile communication network to a messaging proxy entity 312 of the wireless carrier. Similar to process 200 of FIG. 2, as described above, the request in this example includes the secured message itself and a unique identifier (e.g., MDN) associated with the user's or intended message-recipient's mobile device 304. While the examples provided herein describe using HTTPS for sending secured messages, it should be noted that the techniques for secured message transmission described herein are not limited to secured communication channels based on HTTPS. For example, third-party application 302 may establish a secured communication channel with messaging proxy entity 312 via a secured virtual private networking (VPN) connection or a dedicated circuit connection through the mobile communication network operated by the wireless carrier.

Also, as shown in FIG. 3, the carrier's messaging proxy entity 312 forwards the secured message request (at S2) from third-party application 302 to a message server 310 (e.g., message server 150 of FIG. 1, as described above) in the mobile communication network. In some implementations, message server 310 is implemented as an MMSC of the mobile communication network, as described above. In an example, the communication between the carrier's messaging proxy entity 312 and message server 310 is secured using, for example, the carrier's secure core network infrastructure for MMS in the mobile communication network. The secure core network in this example may utilize, for example, a secure interface between the carrier's messaging proxy entity 312 and the message server 310 in accordance with version 7 of the multimedia messaging (MM7) standard interface.

In some implementations, third-party application 310 enables a secure message flag in the secured message (e.g., in a header portion or body of the secured message) in order for the carrier messaging proxy entity 312 and message server 310 to quickly identify the message from third-party application 302 as being a secured message. The secure message flag included within the secured message may be initialized by third-party application 302 and may remain in an initialized state as the secured message is routed from third-party application 302 through the mobile communication network to message server 310 via the carrier messaging proxy entity 312. The secured message may be formatted according to any of various message formats. The particular message format that is used may depend on, for example, the type of messaging protocol used in a particular implementation. For example, a messaging protocol may specify a message format based on extensible markup language (XML) schema. The syntax for such an XML-based message format may include, for example, a "<SecuredMessage>" XML tag whose value may be set to "True" in order to identify a particular message as being a secured message and thus, enable the secured messaging functionality described herein.

Similar to the mobile-to-mobile secured messaging example of FIG. 2, described above, message server 310 sends a port directed SMS notification (at S3) to mobile device 304 via the mobile communication network, in response to receiving the secured message request initiated by the message sender (or third-party application 302 in this example). The notification message includes, for example, instructions for mobile device 304 to retrieve the secured message through the mobile communication network. As described above, the secured message may be stored in a local data store coupled to message server 310, and the instructions may include a unique message identifier and a network address or URL link to the location of the stored secured message. As shown in FIG. 3, the notification message from message server 310 may be sent to mobile device 304 through a message gateway device of the mobile communication network 315 coupled to message server 310.

Also, similar to message server 210 of FIG. 2, as described above, message server 310 may determine whether or not mobile device 304 is capable of receiving secured messages. Message server 310 may make such a determination prior to sending the notification message to mobile device 304. Further, in cases where mobile device 304 is determined to be inactive or unavailable on the mobile communication network (e.g., if it is powered off or outside of the carrier's wireless service area), message server 310 stores the secured message from third-party application 302 and waits to send the notification message until mobile server 304 is determined to be available on the mobile communication network.

In some implementations, the client application executable at mobile device 304 may be preconfigured to receive messages from message server 310 on a preconfigured communication port used specifically for purposes of receiving communications related to the secured message transmission capability described herein. Accordingly, message server 310 may send the notification message (e.g., as an SMS message) directed to the preconfigured port of the client application executable at mobile device 304. In an example, a communication port for the client application may be preconfigured to receive secured message notifications from message server 310 through the mobile communication network. Information identifying the preconfigured communication port may be stored along with other subscriber information associated with mobile device 304 during an initial registration or activation of the client application, which enables the client application for receiving secured messages from message server 310 at mobile device 304. Further, the preconfigured data port and other subscriber information (e.g., authentication token or credentials) may be stored for mobile device 304 in association with a unique device identifier (e.g., MDN) for mobile device 304. Message server 310 may therefore use the unique device identifier included within the request from third-party application 302 (at S1) to identify mobile device 304 and retrieve the appropriate data port information for directing secured message notifications to mobile device 304.

Upon receiving the notification message from message server 310 at the preconfigured data port, the client application at mobile device 304 sends a request (S4) to establish a secured communication channel (e.g., using HTTPS) with message server 310. The request from mobile device 304 includes, for example, authentication credentials (e.g., MDN or registered username and password) associated with mobile device 304 (e.g., registered with message server 304) for accessing the secured message delivery capability as described herein. The authentication information from mobile device 304 is sent by message server 310 (S5) to an authentication server 320 (e.g., authentication server 140 of FIG. 1, as described above). Authentication server 320 may be implemented as, for example, an SSO server within the mobile communication network, as described previously.

Also, as described above, authentication server 320 authenticates mobile device 304 using the authentication credentials from mobile device 304 via message server 310. Based on the results of the authentication, authentication server 320 sends a response (S6) indicating whether or not mobile device 304 is successfully authenticated and is therefore associated with the intended recipient of the secured message. Upon successful authentication of mobile device 304, message server 310 sends a message (S7) to mobile device 304 that acknowledges that the device has been successfully authenticated. In response to the authentication acknowledgement received from message server 310, mobile device 304 uses the instructions included in the notification message sent by message server 310 (at S3) to request the secured message content (S8). As described above, the secured message may be stored at message server 310 (or data store coupled thereto), and mobile device 304 may retrieve the secured message stored at message server 310 (or data store) directly via the mobile communication network. Further, once the message has been retrieved by mobile device 304, message server 310 may send a delivery report (S9) to the wireless carrier's message proxy entity 312, which in turn sends a delivery acknowledgement to third-party application 302 (at S10).

Also, as shown in FIG. 3, mobile device 304 may send secured message content to third-party application 302 through the mobile communication network. Third-party application 302 in this example is a trusted third-party, where communications between message server 310 or other network elements of the mobile communication network and third-party application 302 are managed by the carrier's message proxy entity 312. Thus, the steps involving authentication by authentication server 320 via message server 310, at least with respect to retrieval of the secured message, may be excluded from the secured message transmission process. As such, the secured message transmission process from mobile device 304 (message sender in this example) to third-party application 310 (the message recipient) includes only the steps of mobile device 304 sending the secured message (S11) to message server 310. Message server 310 then forwards the message (S12) to the appropriate message proxy entity 312 of the wireless carrier, which in turn delivers the secured message (S13) to third-party application 302.

Figure 4:
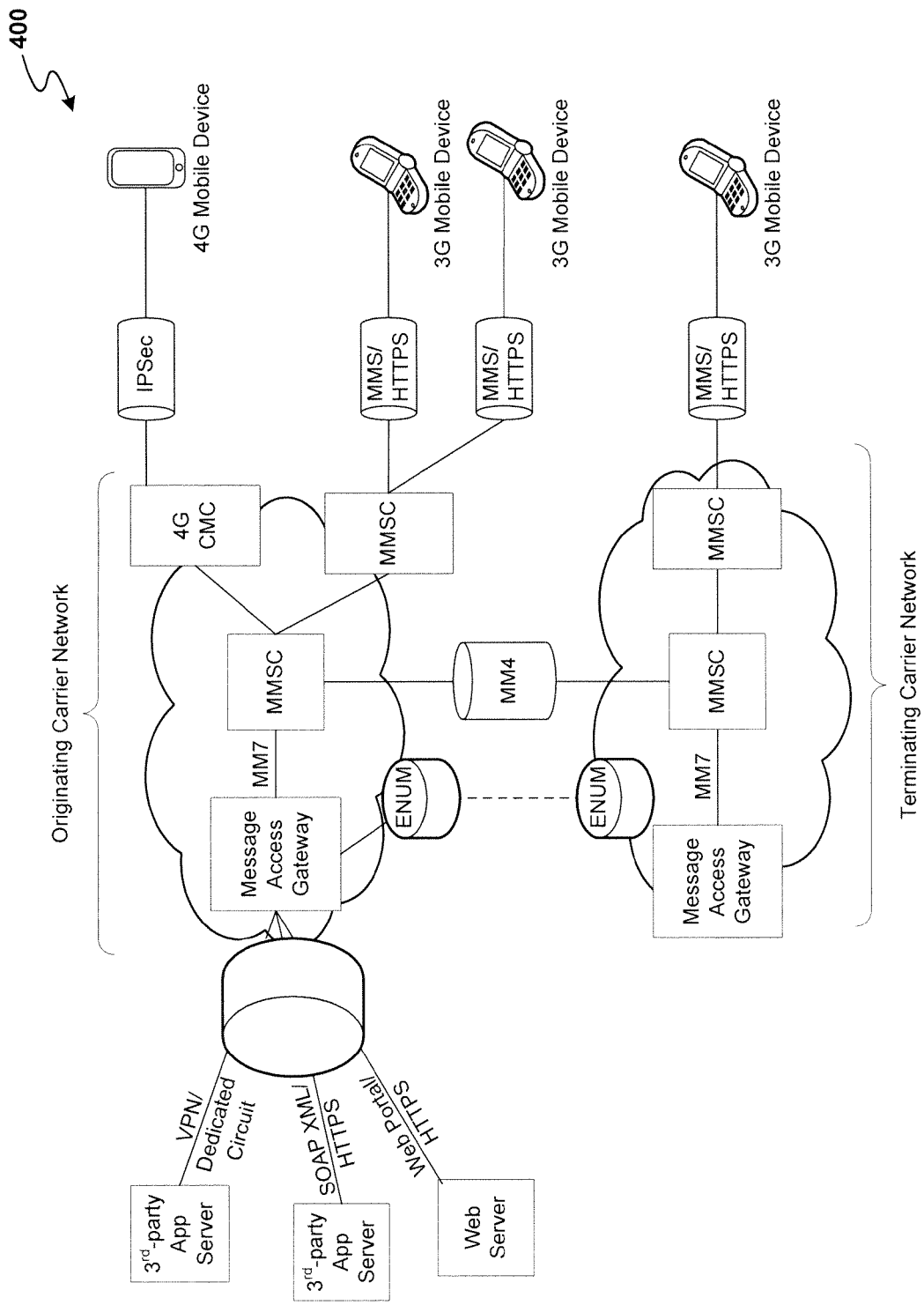
FIG. 4 illustrates an exemplary network architecture for providing secure messaging services for applications or mobile devices across different mobile communication networks of different wireless carriers.

FIG. 4 illustrates an exemplary network architecture 500 for providing secure messaging services for applications or mobile devices across different mobile communication networks of different wireless carriers. As shown in the example of FIG. 4, each mobile communication network includes a message access gateway device and one or more message servers, where each message server may be implemented using, e.g., an MMSC in the respective mobile communication network. Also, as shown in the example of FIG. 4, a different MMSC may be used for each of the different types of radio access networks (e.g., 3G or 4G networks) of the mobile communication network. In an example, secured communications between an MMSC and a mobile device on a 3G radio access network of the mobile communication network may be through an application protocol layer of a secured communication channel, e.g., over an HTTPS data connection. In a different example, secured communications between an MMSC and a mobile device on a 4G radio access network of the mobile communication network may be through an Internet protocol layer of a secured communication channel, e.g., based on Internet Protocol Security (IPSec) standards.

In the example shown in FIG. 4, communications between different wireless carriers may be based on a secure message property that may be standardized across different wireless carriers' mobile communication networks. In an example, a secure message property may be associated with each subscriber's unique mobile device identifier (e.g., MDN). An existing mobile device identifier stored in an E.164 standard telephone number mapping (or "ENUM") database for each of a wireless carrier's subscribers may be updated with the mobile device identifier including the new secure message property. The secured messaging service described herein may be provided as, for example, an optional service offered by each wireless carrier to subscribers in addition to standard voice and data communication services provided by the wireless carrier. Accordingly, each carrier may maintain its own ENUM database that includes an indication of whether or not a particular subscriber has subscribed to the secured messaging service of the subscriber. The information stored for a subscriber within a carrier's ENUM database may also include additional information related to the secured message delivery service with respect to a particular user's mobile device. Such information may include, for example and without limitation, information related to the preconfigured communication port of a mobile device for directing notification (e.g., SMS) messages as well as information as to whether or not the mobile device is a type of device that is capable of receiving secured messages.

In an example, when a mobile device user on one carrier's mobile communication network sends a secured message to a recipient mobile device user who is on a different carrier's network, the originating network carrier messaging proxy entity (e.g., a message access gateway device) in the originating carrier network conducts a search of an appropriate ENUM database to determine whether or not the recipient mobile device associated with the mobile device identifier (e.g., MDN) is capable of receiving the secured message. The particular ENUM database that is searched may be based on, for example, the terminating or recipient's carrier network. If, for example, the recipient mobile device is not capable of receiving or supporting secure message retrieval or downloads, a message server (e.g., an MMSC) of the mobile communication network of either the originating or recipient carrier network, for example, as desired for a particular implementation, sends a notification to the originating mobile device or message sender.

However, if the recipient's mobile device is capable of receiving secured messages, the originating carrier's MMSC sends the secured message with a secure message flag enabled, as described above to the terminating carrier network. In some implementations, the secured message from one carrier's MMSC to another's may be sent through an MM4 interface. The mobile device of the intended recipient in this example may take similar steps to retrieve the secured message, as described above with respect to processes 200 and 300 of FIGS. 2 and 3, respectively. However, the difference in this example is that the terminating MMSC that delivers the secured message from the sender's mobile device is on a different carrier's mobile communication network than that of the message recipient's mobile device. Thus, the information is stored within the ENUM database in association with the unique mobile device identifier associated with the message recipient's mobile device. In a further example, the ENUM database of the originating carrier MMSC sends an SMS notification, e.g., a port-directed SMS, to the recipient's mobile device.

Figure 5:
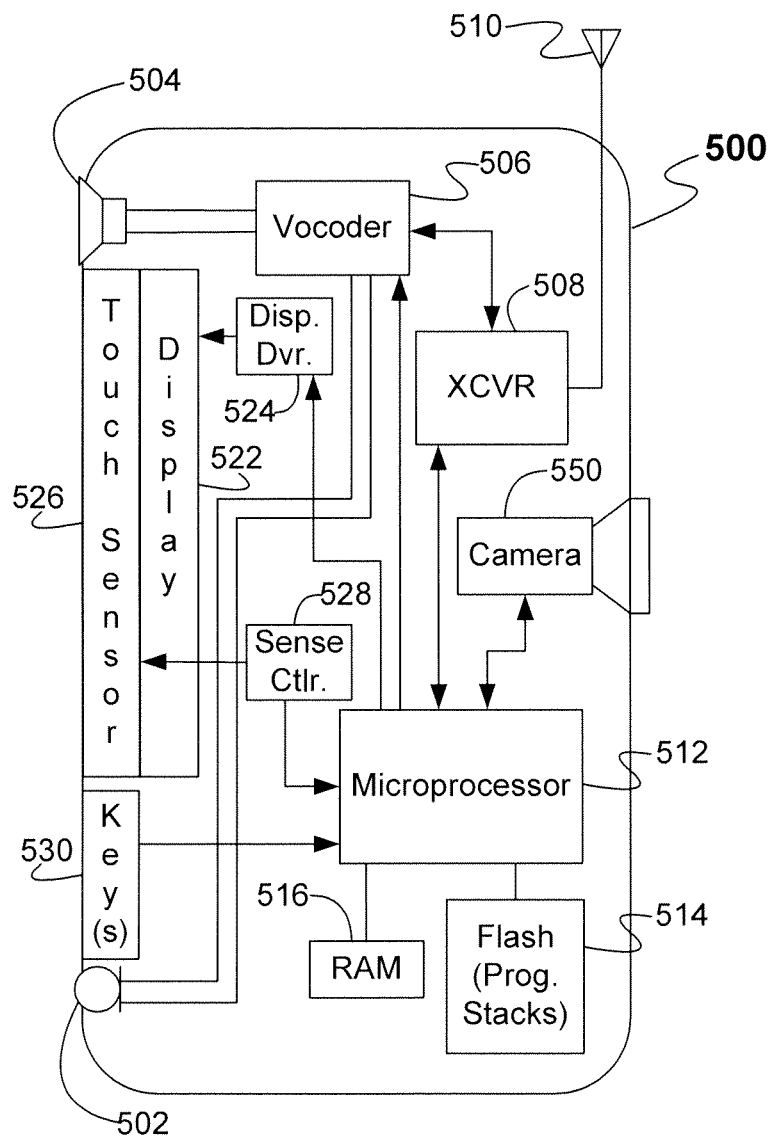
FIG. 5 is a high-level functional block diagram of an example mobile device.

FIG. 5 is a high-level functional block diagram of an example mobile device 500 for practicing an embodiment of the subject technology. In the example of FIG. 4, mobile device 500 is in the form of a mobile handset including a touch-screen display. Examples of touch-screen type mobile devices that may be used to implement mobile device 500 may include, but are not limited to, a smart phone device or tablet computer. However, the structure and operation of the touch-screen type mobile device 500, as will be described in further detail below, is provided by way of example, and the subject technology as described herein is not intended to be limited thereto. It should be appreciated that the disclosed subject matter may be implemented using a non-touch screen type mobile or portable device (e.g., mobile device 104 of FIG. 1, as described above) having communication and data processing capabilities, including capabilities to receive and display caller-specific information including image data associated with the caller at the device. Examples of such mobile devices may include, but are not limited to, net-book computers, tablets, notebook computers and the like. For example, the relevant functional elements/aspects of mobile devices 102 and 104 of FIG. 1, as described above, may be implemented using the example mobile device 500 illustrated in FIG. 4.

For purposes of discussion, FIG. 4 provides a block diagram illustration of an exemplary mobile device 500 having a touch-screen user interface. As such, mobile device 500 can be any smart mobile device (e.g., smart-phone or tablet device). Although possibly configured somewhat differently, at least logically, a number of the elements of the exemplary touch-screen type mobile device 500 are similar to the elements of mobile device 500, and are identified by like reference numbers in FIG. 4. For example, the touch-screen type mobile device 500 includes a microphone 502, speaker 504 and vocoder 506, for audio input and output functions, much like in the earlier example. The mobile device 500 also includes at least one digital transceiver (XCVR) 508, for digital wireless communications, although the mobile device 500 may include an additional digital or analog transceiver. The concepts discussed here encompass embodiments of the mobile device 500 utilizing any digital transceivers that conform to current or future developed digital wireless communication standards. As in mobile device 500, the transceiver 508 provides two-way wireless communication of information, such as vocoded speech samples and/or digital information, in accordance with the technology of a network, as described above. The transceiver 508 also sends and receives a variety of signaling messages in support of the various voice and data services provided via the mobile device 500 and the communication network. Each transceiver 508 connects through RF send and receive amplifiers (not separately shown) to an antenna 510. The transceiver may also support various types of mobile messaging services, such as short message service (SMS), enhanced messaging service (EMS) and/or multimedia messaging service (MMS).

As in the example of mobile device 500, a microprocessor 512 serves as a programmable controller for the mobile device 500, in that it controls all operations of the mobile device 500 in accord with programming that it executes, for all general operations, and for operations involved in the procedure for obtaining operator identifier information under consideration here. Mobile device 500 includes flash type program memory 514, for storage of various program routines and mobile configuration settings. The mobile device 500 may also include a non-volatile random access memory (RAM) 516 for a working data processing memory. Of course, other storage devices or configurations may be added to or substituted for those in the example. Hence, as outlined above, the mobile device 500 includes a processor, and programming stored in the flash memory 514 configures the processor so that the mobile device is capable of performing various desired functions, including in this case the functions associated with a client application executing on the mobile device, involved in the techniques for providing advanced data services by the carrier.

In the example shown in FIG. 5, the user input elements for mobile device 500 include a touch-screen display 522 (also referred to herein as "display screen 522" or simply, "display 522") and a keypad including one or more hardware keys 530. For example, the keypad may be implemented as a sliding keyboard of mobile device 500 and keys 530 may correspond to the keys of such a keyboard. Alternatively, the hardware keys 530 (including keyboard) of mobile device 500 may be replaced by soft keys presented in an appropriate arrangement on the touch-screen display 522. The soft keys presented on the touch-screen display 522 may operate similarly to hardware keys and thus, can be used to invoke the same user interface functions as with the hardware keys.

In general, the touch-screen display 522 of mobile device 500 is used to present information (e.g., text, video, graphics or other content) to the user of the mobile device. Touch-screen display 522 may be, for example and without limitation, a capacitive touch-screen display. In operation, touch-screen display 522 includes a touch/position sensor 526 for detecting the occurrence and relative location of user input with respect to the viewable area of the display screen. The user input may be an actual touch of the display device with the user's finger, stylus or similar type of peripheral device used for user input with a touch-screen. Use of such a touch-screen display as part of the user interface enables a user to interact directly with the information presented on the display.

Accordingly, microprocessor 512 controls display 522 via a display driver 524, to present visible outputs to the device user. The touch sensor 526 is relatively transparent, so that the user may view the information presented on the display 522. Mobile device 500 may also include a sense circuit 228 for sensing signals from elements of the touch/position sensor 526 and detects occurrence and position of each touch of the screen formed by the display 522 and sensor 526. The sense circuit 528 provides touch position information to the microprocessor 512, which can correlate that information to the information currently displayed via the display 522, to determine the nature of user input via the screen. The display 522 and touch sensor 526 (and possibly one or more keys 530, if included) are the physical elements providing the textual and graphical user interface for the mobile device 500. The microphone 502 and speaker 504 may be used as additional user interface elements, for audio input and output, including with respect to some functions related to the automated picture caller-ID feature for incoming voice calls, as described herein.

In the illustrated example of FIG. 5, the mobile device 500 also includes a digital camera 550, for capturing still images and/or video clips. Although digital camera 550 is shown as an integrated camera of mobile device 500, it should be noted that digital camera 550 may be implemented using an external camera device communicatively coupled to mobile device 500. The user may, for example, operate one or more keys 530 or provide input via touch sensor 526 (e.g., via a soft key displayed via the touch-screen display 522) to take a still image, which essentially activates the camera 550 to create a digital representation of an optical image visible to the image sensor through the lens of the camera. For example, the image may be of the subscriber or user associated with mobile device 500, as described previously. The camera 550 supplies the digital representation of the image to the microprocessor 512, which stores the representation as an image file in one of the device memories. The microprocessor 512 may also process the image file to generate a visible image output as a presentation to the user on the display 522, when the user takes the picture or at a later time when the user recalls the picture from device memory. Video images could be similarly processed and displayed. An audio file or the audio associated with a video clip could be decoded by the microprocessor 512 or the vocoder 506, for output to the user as an audible signal via the speaker 504.

As shown by the above discussion, functions relating to automatically retrieving secured message content and displaying the content to a user in response to an inbound secured message notification may be implemented at a mobile device of a user, as described above with respect to mobile devices 102 and 104 of FIG. 1, mobile devices 202 and 204 of FIG. 2, mobile devices 302 and 304 of FIG. 3, and mobile device 500 of FIG. 5. However, it should be noted that such functions are not limited thereto and that such functions also may be implemented using any general-purpose computing device including, for example and without limitation, a personal desktop computer or workstation device communicatively coupled to a camera or other image capturing device for capturing digital images.

Figure 6:
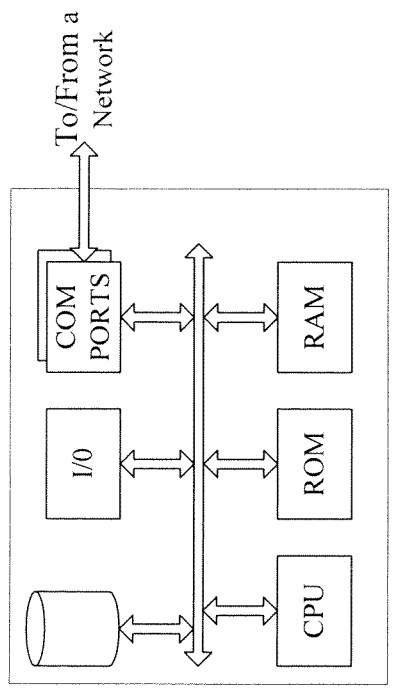
FIG. 6 is a simplified functional block diagram of an example computer that may be configured as a host or server in the network environment of FIG. 1.
Figure 7:
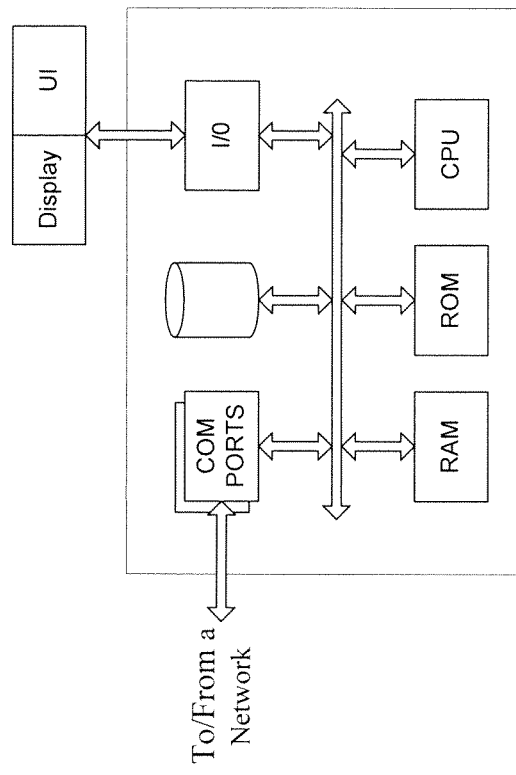
FIG. 7 is a simplified functional block diagram of an example personal computer or other workstation or terminal device in the network environment of FIG. 1.

FIGS. 6 and 7 provide functional block diagram illustrations of general-purpose computer hardware platforms. FIG. 6 illustrates a network or host computer platform, as may typically be used to implement a server (e.g., authentication server 140 or message server 150 of FIG. 1, as described above). FIG. 7 depicts a computer or workstation device with user interface elements, as may be used to implement a personal computer (e.g., device 106 of FIG. 1, as described above). It is believed that the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

Hence, aspects of the various network components of the mobile communication networks described with respect to FIGS. 1-4, as described above, may be embodied in programming. Program aspects of the technology may be thought of as "products" or "articles of manufacture" typically in the form of executable code or process instructions and/or associated data that is stored on or embodied in a type of machine or computer readable storage medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of a web application/service provider into the computer platform of the application or web server that will be hosting the web application/service.

Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible storage media, terms such as "computer' or "machine readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the functions performed by the various network components of the mobile communication networks described with respect to FIGS. 1-4, as described above. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

As noted above, the computer as illustrated in the example of FIG. 7 may be a desktop computer or workstation with user interface elements, as may be used to implement a laptop, tablet or notebook computer or the like. For example, such a device may include a touch-screen display for user input and output. Alternatively, the device may include a standard light emitting diode (LED) display and, for example, an alphanumeric keypad or QWERTY keyboard. It is believed that the structure, programming, and general operation of such computing equipment and as a result the drawing should be self-explanatory. As known in the data processing and communications arts, a mobile computer comprises a central processor or other processing device, an internal communication bus, various types of memory or storage media (RAM, ROM, EEPROM, cache memory, disk drives, etc.) for code and data storage, and one or more network interface cards or ports for communication purposes. Also, the mobile computer can further comprise various wireless transceiver modules (or components) such as GPS, WiFi, IrDA, Bluetooth, etc. The software functionalities involve programming, including executable code, associated stored data, and graphical user interface code for implementing a client application program at the mobile device. The software code is executable by the processor of the mobile computer. In operation, the code is stored within the mobile computer. At other times, however, the software may be stored at other locations and/or transported for loading into the appropriate mobile computer. Execution of such code by a processor of the mobile computer enables the mobile computer to implement the methodology of a client application (e.g., a messaging client) for retrieving and displaying an secured message including text or image content in response to a secured message notification received at the mobile computer, in essentially the manner performed in the implementation discussed and illustrated herein.

Further, the client can be implemented in a remote computer (or server) on a network. That is, a client device (e.g., mobile device) sends information (e.g., a request message) to the remote server for requesting access to a function of a web application hosted at the server; and the remote server processes the request based on the request received from the client and returns an appropriate response (e.g., including application data retrieved from a database) to the client over the network. In the example above, the client device operates as a client terminal and the remote computer as a server in a client-server network environment.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method using steps of:
receiving, from an originating device, a request for transmission of a secured message to a recipient mobile device through a mobile communication network, the request including the secured message and a mobile device identifier associated with the recipient mobile device;
establishing a secure communication channel to the recipient mobile device via the mobile communication network based on the received request;
storing the secured message received from the originating device within a data store in association with the mobile device identifier associated with the recipient mobile device;
transmitting a notification of the secured message to the recipient mobile device through the established secured communication channel of the mobile communication network, the notification including instructions for the recipient mobile device to retrieve the stored secured message through the mobile communication network;
upon receiving authentication credentials from the recipient mobile device via a secure data channel of the mobile communication network, authenticating the recipient mobile device based on the received authentication credentials; and
when the recipient mobile device has been authenticated successfully, allowing the recipient mobile device to retrieve the stored message using the instructions included in the transmitted notification via the secure data channel of the mobile communication network.

2. The method of claim 1, wherein the mobile device identifier associated with the recipient mobile device is a mobile directory number (MDN).

3. The method of claim 1, wherein the transmitted instructions include a network location address of the secured message stored within the data store of the mobile communication network.

4. The method of claim 1, wherein the secure communication channel is a secured HTTP communication channel and the secured message is transmitted via MMS through the mobile communication network.

5. The method of claim 1, wherein the originating device is a mobile device in the same mobile communication network as the recipient mobile device.

6. The method of claim 1, wherein the originating device is an application server on a third-party data network.

7. The method of claim 1, wherein the transmitting step further comprises:
determining whether or not the recipient mobile device is capable of receiving the secured message,
wherein the notification of the secured message is transmitted to the recipient mobile device through the established secured communication channel of the mobile communication network only when the recipient mobile device is determined to be capable of receiving the secured message.

8. The method of claim 7, wherein secured message includes multimedia content, and the determination of whether or not the recipient mobile device is capable of receiving the secured message includes whether or not the recipient mobile device is capable of receiving multimedia content.

9. The method of claim 7, wherein:
the determination of whether or not the recipient mobile device is capable of receiving the secured message includes determining whether or not the recipient mobile device is available on the mobile communication network to accept the notification of the secured message, and
the notification of the secured message is transmitted to the recipient mobile device only when the recipient mobile device is determined to be available via the mobile communication network.

10. The method of claim 9, further comprising:
when the recipient mobile device is determined not to be available on the mobile communication network for a predetermined period of time, transmitting an error notification to the originating device.

11. The method of claim 1, wherein the originating device is a mobile device associated with the mobile communication network and the recipient mobile device is associated with a different mobile communication network of a different wireless carrier than that of the originating device.

12. The method of claim 1, further comprising:
querying a database associated with the different wireless carrier for subscriber information associated with recipient mobile device bused on the mobile device identifier associated with the recipient mobile device; and
determining whether or not the recipient mobile device is capable of receiving the secured message based on the subscriber information associated with the recipient mobile device.

13. The method of claim 12, wherein the database is an E.164 standard telephone number mapping (ENUM) database associated with the different wireless carrier.

14. A server system comprising:
network communication device configured to exchange data communications through a communication network, the communication network including at least one database accessible to the network communication device;
a processor coupled to the network communication device;
a storage device accessible to the processor; and
an application program in the storage device, the application program including a plurality of functions of a secured message transmission service, wherein execution of the application program by the processor configures the application server to exchange data communications related to the plurality of functions with one or more client devices through the communication network,
wherein the processor is configured to perform functions, including functions to:
receive, from an originating device, a request for transmission of a secured message to a recipient mobile device, through a mobile communication network, the request including the secured message and a mobile device identifier associated with the recipient mobile device;
establish a secure communication channel to the recipient mobile device via the mobile communication network based on the received request;
store the secured message received from the originating device within a data store in association with the mobile device identifier associated with the recipient mobile device;
transmit a notification of the secured message to the recipient mobile device through the established secured communication channel of the mobile communication network, the notification including instructions for the recipient mobile device to retrieve the stored secured message through the mobile communication network;
receive authentication credentials from the recipient mobile device via a secure data channel of the mobile communication network;
authenticate the recipient mobile device based on the received authentication credentials; and
when the recipient mobile device has been authenticated successfully, allow the recipient mobile device to retrieve the stored message via the secure data channel of the mobile communication network using the instructions included within the transmitted notification.

15. The system of claim 14, wherein the mobile device identifier associated With the recipient mobile device is a mobile directory number (MDN).

16. The system claim 14, wherein the secure communication channel is a secured HTTP communication channel, and the secured message is transmitted via MMS through the mobile communication network.

17. The system of claim 14, wherein the originating device is a mobile device in the same mobile communication network as the recipient mobile device.

18. The system of claim 14, wherein the originating device is an application server on a third-party data network.

19. The system of claim 14, wherein the processor is further configured to perform functions to:
determine whether or not the recipient mobile device is available on the mobile communication network to accept the notification of the secured message,
wherein the processor is configured to transmit the notification of the secured message to the recipient mobile device based on a determination that the recipient mobile device is available on the mobile communication network.

20. The system of claim 19, wherein the processor is further configured to perform a function to:
transmit an error notification to the originating device after a predetermined period of time based on a determination that the recipient mobile device is not available on the mobile communication network.

21. The system of claim 14, wherein the processor is further configured to perform a function to:
determine whether or not the recipient mobile device is capable of receiving the secured message,
wherein the transmission of the notification of the secured message to the recipient mobile device through the established secured communication channel of the mobile communication network is based on a determination that the recipient mobile device is capable of receiving the secured message.

22. The system of claim 14, wherein the originating device is a mobile device associated with the mobile communication network and the recipient mobile device is associated with a different mobile communication network of a different wireless carrier than that of the originating device.

* * * * *